United States Patent [19]

Johnston et al.

[11] 3,825,208

[45] July 23, 1974

[54] CARTRIDGE AND STORAGE APPARATUS

[75] Inventors: Daniel H. Johnston; Rudy Mannheimer, both of Boulder; Helfried O. Rinkleib, Longmont; Ivan D. Walker, Boulder, all of Colo.; John R. Kellner, Big Pine Key, Fla.

[73] Assignee: International Business Machines Corporation, Armonk, N.Y.

[22] Filed: Dec. 27, 1972

[21] Appl. No.: 318,954

[52] U.S. Cl. .................................. 242/197, 274/4 F

[51] Int. Cl.... G03b 1/04, G11b 15/32, G11b 23/04

[58] Field of Search ............. 242/46.21, 46.4, 55 R, 242/71.8, 197–200; 274/4 B, 4 F

[56] References Cited

UNITED STATES PATENTS

| | | | |
|---|---|---|---|
| 1,606,563 | 11/1926 | Deane | 206/52 W |
| 1,662,780 | 3/1928 | Miller | 242/46.4 |
| 2,545,145 | 3/1951 | Hoyle | 242/137.1 |
| 2,746,691 | 5/1956 | Hoad | 242/55 |
| 3,042,180 | 7/1962 | Bishop | 242/71.8 X |
| 3,207,454 | 9/1965 | Bendar | 242/68.3 |
| 3,341,001 | 9/1967 | Barclay et al. | 206/52 F |
| 3,556,423 | 1/1971 | Steffenini | 242/46.21 |
| 3,556,535 | 1/1971 | Chabot | 274/4 F |
| 3,599,986 | 8/1971 | Ban | 274/4 F |
| 3,627,225 | 12/1971 | Badum et al. | 242/182 |
| 3,631,971 | 1/1972 | Rinkleib | 206/52 R |

*Primary Examiner*—Leonard D. Christian
*Attorney, Agent, or Firm*—Donald W. Margolis

[57] ABSTRACT

This cartridge storage apparatus includes detents for engaging and supporting a cartridge. The cartridge is comprised of a hub member for receiving a wound web and a shell cover to generally enclose the winding surface of the hub. One end of the hub is hollow and open. The hollow open end of the hub is accessible both when the winding surface of the hub is enclosed within the shell and when the hub is separated from the shell. The cartridge and the hub of the cartridge are both unique in that the inner surface portion of the hub, accessible through the hollow open end, includes a portion that actively grips the detent, that portion including a surface irregularity. The hub member and shell each carry a portion of a locking mechanism which enables them to be releasably locked together in a closed position. The locking arrangement is distinguished by the requirement that a separate tool is normally needed to disengage it when separation of the hub and shell is desired. The invention also includes the combination of a unique cartridge with a record handling system when the cartridge includes a wound record media.

32 Claims, 7 Drawing Figures

CARTRIDGE AND STORAGE APPARATUS

BACKGROUND OF THE INVENTION

1. Field of the Invention

This invention relates to cartridge storage apparatus. It is specifically directed to a unique cartridge for active engagement by a detent support, and the unique hub portion of the cartridge which makes such support possible. A system for using the cartridge is also disclosed.

2. Description of the Prior Art

Electronic data processing utilizes large volumes of magnetic recording media in the form of flexible webs. Long lengths of flexible material are normally wound on a hub for ease of storage and handling. Where it is desired to avoid or confine axial movement of a web on a hub, one or more flanges are normally added to the ends of the hub. Such flanges not only define the winding surface of the hub and provide axial support to a web wound on the hub, but they also provide protection for the edges of wound web material on the hub.

Where the desire exists to provide further protection for wound material, devices in addition to a hub and flange are utilized. In one family of devices the wound web is protected on a two-flanged reel by encompassing and enclosing the area between the periphery of the flanges with an appropriately dimensioned strip. Such peripheral strips usually include a locking mechanism so that the ends of the circumscribing material can be locked together. In another family of protection devices the entire hub of wound material, with or without flanges, may be placed within a container including, for example, both a bottom portion and a top portion which can be closed together in mating relationship to completely enclose the wound material. Such containers usually include a mechanical locking mechanism to frustrate unintentional opening of the container. In yet another prior art protective arrangement, a flange attached to the winding hub is designed to serve as a portion of a protective cartridge and mate with a shell which encloses the hub and any material wound thereon. Again, locking means, for example, in the form of frictional contact between the shell and the flange, or as a locking mechanism carried by the hub and the shell, are used to lock the cartridge together. In some cartridge arrangements, the center of the hub is hollow and open so that it can be either passively placed upon a support or locked to a support by means of a locking device on the support. However, the hollow center portions of such hubs are invariably smooth, and provide no active locking relationship with the support.

Each of the several arrangements described for protecting wound material on a hub invariably features means for manually separating the protective device from the hub. The locking arrangements are generally such that the frictional or mechanical locking arrangement which secures the protective elements together or to the hub can be either removed by manipulation of the parts or activation of the locking mechanism by hand. Invariably, where a mechanical device is required to release the lock, that device is integral with the container and is normally designed to be, or is capable of being, activated by hand.

As has already been noted, magnetic recording media in the form of flexible magnetic webs is used to retain and transport bits of information in electronic data processing. In use, magnetic webs have most often been in the form of tape wound on a flange protected hub or reel and brought into interaction with one or more transducer by a tape transport device which moves the tape off of and onto the hub. When not in use, it is necessary for magnetic tape wound on a reel to be stored in an environment which provides protection from contamination and shock while still maintaining it in a readily accessible condition. This has lead to the development of peripheral bands, containers and cartridges for magnetic media which closely parallel the development of web protection devices already described.

As the use of magnetic tape within data processing systems is extremely wide, some systems requiring the use of thousands of spools of tape, it becomes a problem to store the tape and retrieve it from storage quickly and easily. Library configurations have been proposed for automatically accessing tape, for example in cartridges, and transporting them to a processing station automatically, see for example copending application Ser. No. 304,698, filed Nov. 8, 1972, by C. E. Peterson et al., and assigned to the assignee hereof. Such automatic handling imposes severe demands on the tape and any hub or cartridge device used to store and protect it. Such a hub and its associated protective device should be strong, light-weight, and subject to easy automatic storing, unloading, opening and closing. Additionally, the structure of the storage cartridge device should be such that it can be securely supported in a manner which avoids unintentional loss or removal of the storage container from a storage apparatus. It should also be designed in a manner which provides for controlled handling and movement from the storage area to the processing area. Finally, for data security in automatic library systems where human interaction with the storage device is not required, the container can be advantageously supplied with a lock which does not normally respond to manual manipulation, but which requires a separate mechanical tool to allow access to the magnetic media.

Therefore, one important object of this invention is to provide a storage system including supports for engaging a web containing cartridge wherein the cartridge is constructed to itself actively grip the support.

Another important object of this invention is to provide a cartridge including a portion which actively grips a storage support or a handling device, and a reel or hub as a portion of the cartridge which displays the same characteristics.

Yet another important object of this invention is to provide a web storage cartridge including a locking mechanism which cannot normally be manually opened, but which requires a separate tool to provide access to the web material.

Still another object of this invention is to provide a web handling system adapted to utilize the gripping character of the storage cartridge.

SUMMARY OF THE INVENTION

To accomplish these and other objects, the storage system of the present invention comprehends a detent for engaging and supporting a cartridge uniquely constructed to itself actively engage or grip the detent. The cartridge includes a base member, a cover member, and a lock integral with the base and cover members for releasably locking said members in a closed position. The base member is preferably in the form of a hub having a single flange while the end of the hub opposed to the flange is hollow and opened outwardly. The inner surface of the hub exposed through the open end includes a surface irregularity for active engagement of the support detent. The cover portion of the cartridge is a cylinder open at one end and closed at the other end, with the exception of a central opening positioned to align with the hub. A locking mechanism is provided to hold the hub and cover together. Disengagement of the locking mechanism may normally be accomplished only by the use of a separate external mechanism. Where the cartridge includes record media, it can be used with a record handling system.

BRIEF DESCRIPTION OF THE DRAWING

The foregoing and other objects, features and advantages of the invention will be apparent from the following more particular description of the preferred embodiments of the invention, as illustrated in the accompanying drawings in which.

DESCRIPTION OF THE PREFERRED EMBODIMENTS

Figure 1:
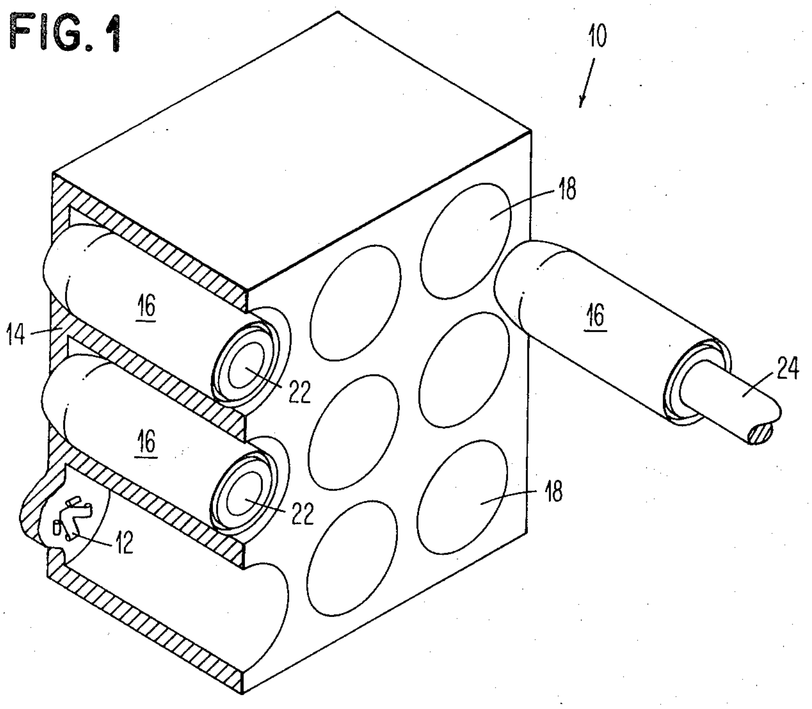
FIG. 1 is a perspective view, partially in section, showing a cartridge storage system including a storage wall.

The storage apparatus 10 shown in FIG. 1 includes a multiplicity of detents 12 supported on a wall 14. As is hereinafter described, cartridges 16 are designed for engagement and support by detents 12. Additional support is provided to the cartridges by extending a matrix of appropriately dimensioned storage compartments 18 from wall 14. In the preferred embodiment each cartridge 16 includes magnetically permeable material 22 in its base. This magnetically permeable material allows the cartridge to be removed from detent 12 and storage compartment 18 by means of an external magnetic force such as that provided by magnetic member 24 which causes the cartridge to translate axially away from the detent. See previously identified copending application Ser. No. 304,698 for details of one such article retrieval apparatus.

Figure 2:
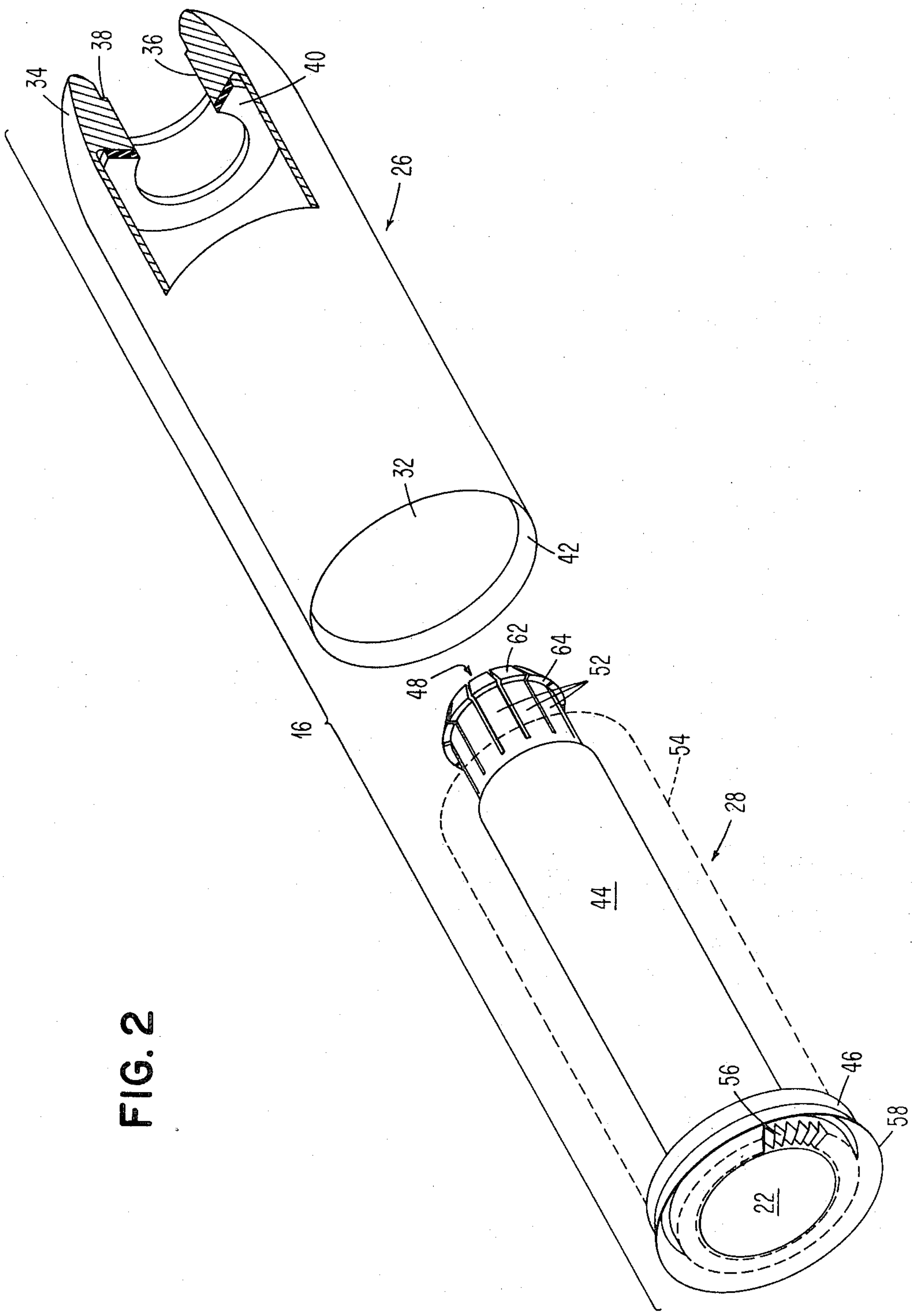
FIG. 2 is an exploded perspective view, partially in section, of a base member and a cover member which constitute a storage cartridge constructed in accordance with this invention.

The details of one preferred embodiment of cartridge 16 are shown in FIG. 2. The cartridge is shown with cover 26 separated from base 28. Cover 26 is generally cylindrical in shape with an open end 32 and a tapered and partially closed end 34. The end of the cover which is tapered is inserted into a storage compartment first, with the taper generally providing for ease of entry and centering in the storage compartment. End 34 of the cover is partially closed by annular flange 36. Flange 36 provides a locking shoulder 38 for engagement by base 28 as described hereinafter. Resilient washer 40 is secured to the inner face of annular flange 36. Portion 42 of the cover adjacent open end 32 is tapered at the inner surface to a reduced thickness.

Base 28 is in the form of a single flange reel including cylindrical hub portion 44 with flange 46 fixed to the hub at one end. End 48 of hub 44 opposed to flange 46 is hollow and opened outwardly and carries a plurality of flexible locking fingers 52. The hub is designed to carry a flexible wound web 54, shown in phantom, for example, in the form of magnetic tape, on the hub surface bounded by flange 46 and flexible fingers 52. The face of flange 46 opposed to hub 44 includes a clutch surface in the form of teeth 56 radially arrayed around magnetically permeable material 22. A deformable skirt 58 extends at an angle from the periphery of flange 46 and in a direction away from hub 44.

When cover 26 and base 28 are brought together, hub 44 and web 54 extend into and are surrounded by the open cylindrical portion of the cover. As closure is continued, cam surfaces 62 of flexible fingers 52 come into contact with annular flange 36. This causes the fingers to flex inwardly until they are able to pass into and through the opening in annular flange 36. When closure is completed, cam portion 62 of each finger extends past annular flange 36, so that the lateral inward constraint of annular flange 36 is no longer applied to fingers 52. In this unconstrained condition flexible fingers 52 straighten and locking rims 64 lock axially on shoulder 38, see FIG. 3. With locking shoulder 38 and locking fingers 52 thus locked together, base 28 cannot normally be removed from within cover 26 without first disengaging the fingers from the shoulder. With closure of the cartridge completed, resilient washer 40 rides in contact with the adjacent edge of wound web 54 and serves to retard any tendency the web has to unwind while closed within the cartridge.

Referring again to FIG. 3, a segment of the cartridge with cover 26 and base 28 locked together is shown in cross-section. The locking relationship between rims 64 of the fingers and locking shoulder 38 is shown in enlarged cross-sectional detail. It is seen that the fingers will remain in locking contact with the shoulder unless urged inwardly. The resiliency and dimensions of the fingers is such that axial force exerted between the cover and base member will not normally cause release of the fingers from the locking shoulder. Similarly, the number, array, resiliency and dimensions of the fingers also normally prevents manual release of the fingers from the shoulder. The fingers are arrayed in such a manner and are of such stiffness that they cannot normally all be depressed simultaneously manually without great difficulty. As long as one finger remains in locking contact with shoulder 38, separation of the base and cover members is not possible. The cartridge is designed with cover 26 completely enclosing base 28. No substantial lateral portion of the base extends outside of the cover. With the base thus enclosed, it provides no portion which can be readily grasped to axially pull the base from the cover and overcome the locking relationship.

When base 28 and cover 26 are in closed relationship, tapered end wall 42 frictionally engages deformable skirt 58 carried by flange 46 of the base. In preferred embodiments, the angle of skirt 58 and the angle of tapered wall portion 42 are such that contact between the two elements is made quickly during closure and the seal is tight and dust proof with substantially all of skirt 58 enclosed by cover 26. Again, this makes manual grasping of the base, to pull it from the cover, difficult to achieve.

Figure 3:
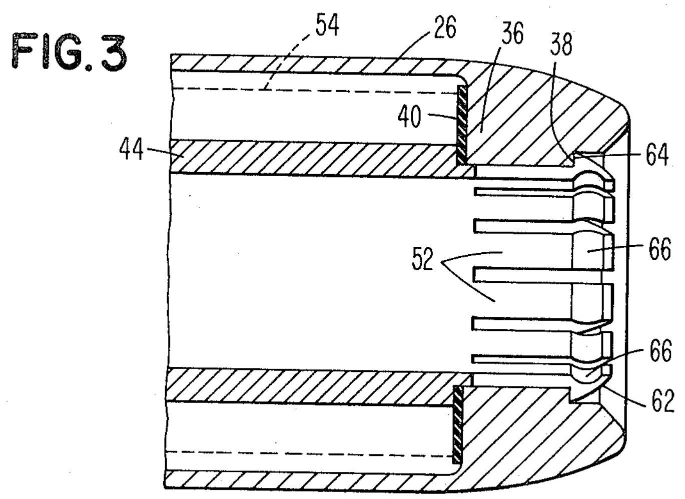
FIG. 3 is an enlarged fragmentary central cross-sectional view through the combined base member and cover member illustrating the locking mechanism of the cartridge of FIG. 2 when the base and cover members are in closed and locked relationship.
Figure 4:
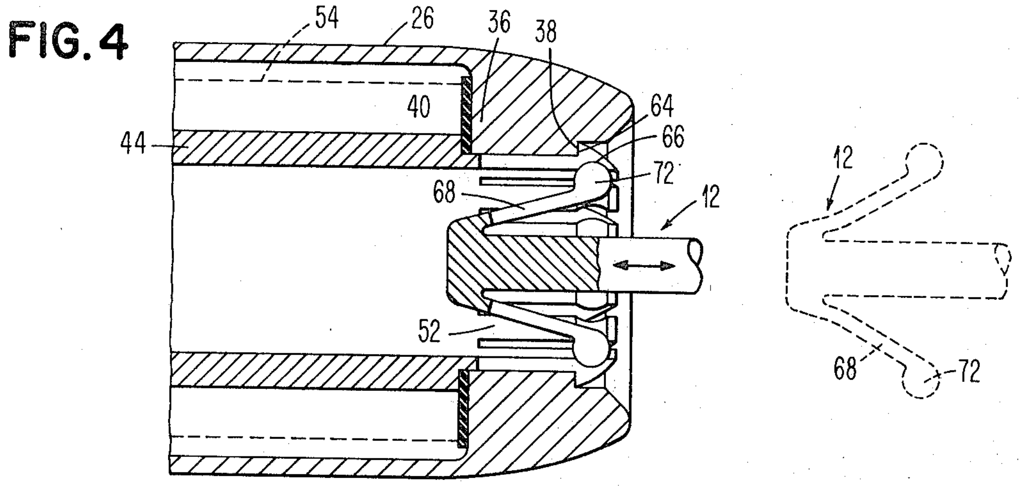
FIG. 4 is an enlarged fragmentary cross-sectional view, similar to FIG. 3, but showing the locked cartridge supported by a storage or handling detent.

FIG. 3 also shows a series of grooves or depressions 66 on the inner surface of the fingers. These irregularities provide a portion on the inner face of the hub which can be actively gripped, for example, by detents 12 for support of the cartridge during storage. The right side of FIG. 4 shows the details of one form of detent 12, in phantom, including a number of flexible fingers 68. Fingers 68 include beaded tips 72 capable of camming engagement and disengagement with grooves 66 on the inner surface of the hub. Due to the open hollow nature of end 48 of hub 44, and its accessibility through cover 26, cartridge 16 can be moved axially to enclose detent 12 causing fingers 68 to cam inwardly until the beaded portions 72 of fingers 68 are seated in grooves 66 to engage and support the cartridge. Because fingers 68 are compressed, they provide substantial gripping pressure on groove 66. Similarly, a cartridge handling member similar in design to detent 12 can be inserted into the hollow open end of the cartridge to engage irregular surface 66 of the hub, and then, when firmly seated, be utilized to position the cartridge or move the cartridge from place to place. Also, base member 28, without cover 26, can be supported or handled by detent 12.

Detent 12 is constructed not only for easy engagement of the cartridge, but also for easy release of the cartridge in response to axial movement. A cartridge can be removed from support and engagement with detent 12 by exerting force upon the cartridge to move it axially away from the detent. One means of applying axial force to the cartridge is by means of magnetic traction applied to magnetically permeable material 22 in the base of the cartridge. Referring to FIG. 1 again, such force is applied, for example, by magnetic member 24. Magnetic member 24 may be either a permanent magnetic or an electromagnetic, and for further translation and action upon the cartridge may be part of an article storage and retrieving device such as that shown in previously noted copending application Ser. No. 304,698.

Figure 5:
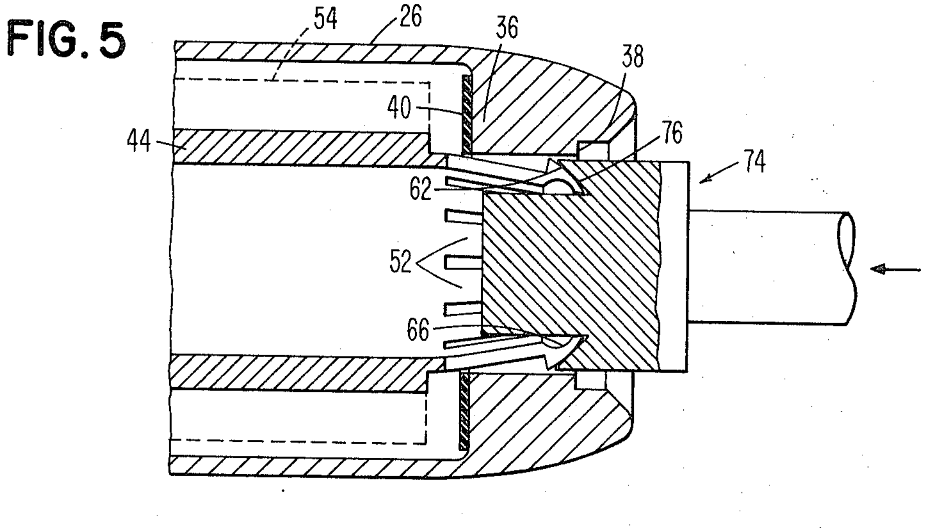
FIG. 5 is an enlarged fragmentary cross-sectional view, similar to FIG. 3 and FIG. 4, but showing the base and cover members being unlocked by a separate mechanical tool.

When it is desired to unlock the cartridge for the removal of cover 26 from base 28, it is normally necessary to utilize separate tool 74. As shown in FIG. 5, tool 74 consists substantially of annular cam follower 76 dimensioned to engage cam surfaces 62 of all of the flexible fingers simultaneously upon movement of tool 74 into contact with fingers 52 and towards the cartridge. As tool 74 moves axially towards the cartridge, cam surface 62 of each finger rides on the surface of cam follower 76 and the fingers are urged inwardly. When the inward movement of the fingers is of such an extent that rims 64 have moved inboard of shoulder 38, the base and cover members are disengaged and can be removed from one another. As shown in FIG. 5, the action of tool 74 has been sufficient to move the fingers inboard of the locking shoulder, and separation of the base and cover members is being initiated by the continuing axial movement of the tool.

Figures 6, 7:
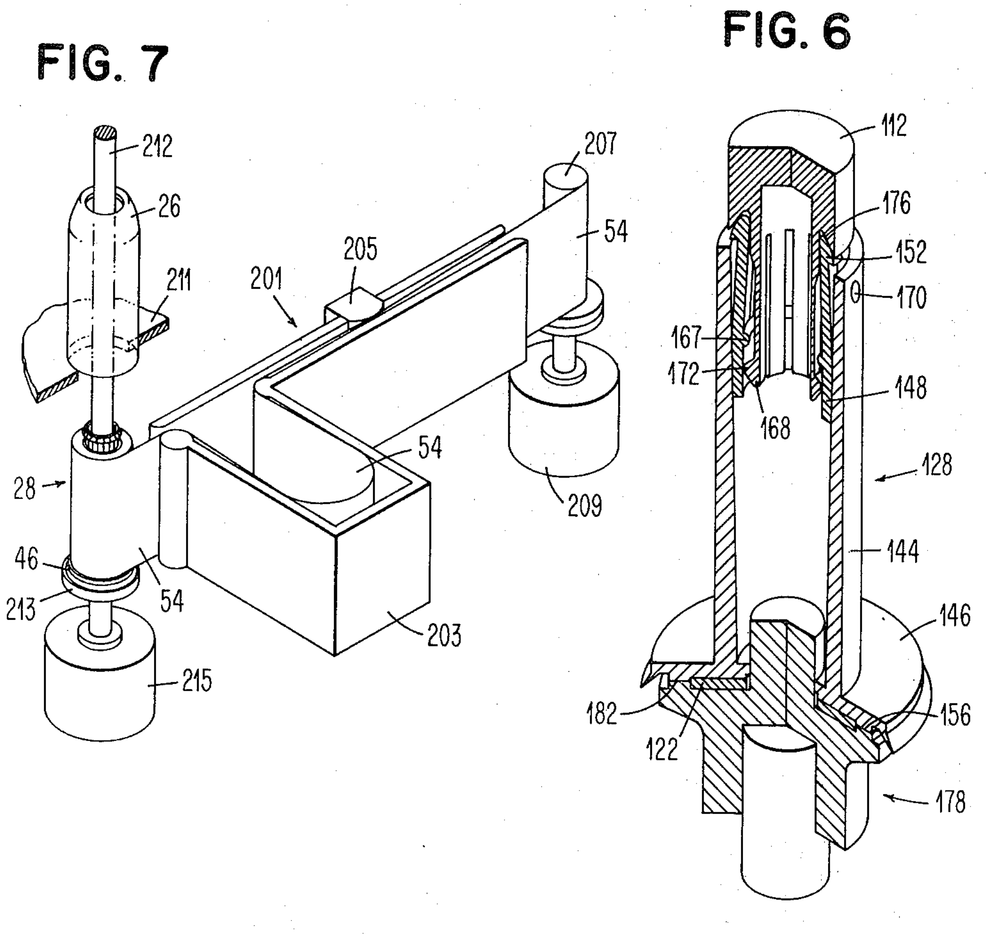
FIG. 6 is a perspective view, partially in section, of an alternative embodiment of the base member of the cartridge and showing its interaction with both a separate unlocking and handling detent mechanism and a drive mechanism for rotating the base member.
FIG. 7 is a diagrammatic perspective view of a record processing apparatus with which the cartridge of this invention may be used.

Referring now to FIG. 6 a modified cartridge base is shown with the reference numbers of parts similar to those shown in FIG. 2 having generally the same numbers, but with 100 added thereto. Base member 128 is shown, without a cover, and in contact with handling tool 112 and clutch couple 178. In this modification, locking fingers 152 are carried by a common element 148. Element 148 including studs, not shown, is inserted into hub 44 with the studs in holes 170. The studs are carried by flexible portions on element 148 and this arrangement allows an element 148 of the base to be removed, for example, where some of the fingers are broken, and replaced by a new element 148. Utilizing this arrangement, the expense of replacing an entire hub is avoided where only an inexpensive finger portion is broken or damaged.

Another variation in the base member shown in FIG. 6 is the inclusion of protruding bead 167 as an irregularity on the inner surface of the hub which provides an element to engage a handling or storage detent. As shown in FIG. 6, handling tool 112, separate and distinct from the cartridge, includes both a cam follower 176 and detent fingers 168. As shown, cam follower 176 of tool 112 serves to urge locking fingers 152 inwardly, from the locking shoulder portion of a cover, not shown, while detent fingers 168 provide means to engage protrusion 167 on the inner surface of the hub. By engaging the protrusion, the hub and any associated cover can be handled or stored. The spacing between beads 172 and cam follower 176 is such that tool 112 can be inserted in the hollow open end of the hub to engage protrusion 167 without necessarily disengaging fingers 152 from a locking arrangement.

The modified cartridge base shown in FIG. 6 also includes a central opening in the base of flange 146 and the adjacent portion of hub 144 is hollow. As shown, a mechanically separate clutch couple 178 is positioned in contact with base flange 146 and into the hollow lower portion of hub 144. Couple 178 provides a clutch surface 182 to engage the clutch face 156 of base flange 146. Couple 178 is attached to a drive, not shown, and can thus drive base member 126 to cause a web to be reeled upon or reeled from the hub. This action can be carried out, for example as shown, where handling member 112 is either driven synchronously with couple 178 or journaled for free rotation.

RECORD PROCESSING SYSTEM

This invention also includes the use of the cartridge described above, with a data-handling system having means to withdraw, process, and return the record media to the cartridge. A data storage system particularly well adapted for handling record media stored in the cartridge of this invention is shown in diagrammatic perspective in FIG. 7. The system includes a processing chamber 201 including a vacuum column 203 and a transducer assembly 205. Takeup reel 207, coupled to drive 209 for both clockwise and counterclockwise rotation, is positioned at the exit of the chamber. Vacuum slots in the hub of reel 207, not shown, provide for connection of tape 54 to the reel. The processing chamber is adapted to receive record media 54 when the media is moved into operative position on the cartridge at the open end of the chamber. Directional air jets in the processing chamber, not shown, assist in the withdrawal of record media 54 from a cartridge hub and guide the media through the processing chamber to the takeup reel 207. The dimensions of the media and the vacuum chamber are such that the tape can effectively seal the chamber so that when tape is positioned across the chamber and a vacuum is applied to the chamber, a pressure differential is created which forces a loop of tape down into the chamber. Of course, such vacuum column media handling technology is well known. Transducer assembly 205 is positioned substantially flush with the sidewall of the processing chamber and is mounted with its operating surface exposed in the column.

Depending upon the method of handling the cartridge, any of several mechanisms may be provided adjacent the entrance of the processing chamber. In the operation shown, the cartridge is positioned, either manually or automatically, above a circular opening in platform 211. The dimensions of the opening in platform 211 are such that cover 26 cannot pass through the opening, but base member 28 can pass through the opening. After a cartridge is positioned on the platform concentric with the opening, handling tool 212, similar to tool 112 described in FIG. 6, is mechanically indexed into the hollow open end of the cartridge hub with sufficient axial movement and force to unlatch the locking fingers of base member 28 from the locking shoulder of cover member 26. When disengagement of the locking mechanism is complete, the base member begins to travel through the opening in platform 211. However, the detent fingers of tool 212 engage the surface irregularity of the base member after it has moved only a short distance. With the base member thus controlled, the tool continues its axial movement towards clutch couple 213 adjacent the entrance of processing chamber 201. Clutch couple 213 is driven by reversible rotary drive 215. With the base member thus positioned, rotation of clutch 213 is initiated in a direction to unreel tape 54 from base member 28. The motion of couple 213 is transferred to the base member through the clutch portion of flange 46. Air jets and air guidance ports within the processing chamber assist in stripping the leading end of the media from its wound condition on the hub and in withdrawing the record media from the base member and into the processing area. After a length of tape completes its travel through processing chamber 201 and is attached to takeup reel 207, vacuum is applied to vacuum column 203 causing a loop of tape to be drawn into the vacuum chamber. Subsequently, controlled rotation of takeup drive 209 and base member drive 215 causes various areas of the media surface to be presented to transducer assembly 205 for reading or writing.

It will be appreciated that other arrangements may be provided to load the media into the processing area. It will also be appreciated that other media motion control means, such as a driven capstan in the processing chamber, may be utilized to control the motion of the tape in the processing chamber.

In accordance with known technology, the drive motors and any added motion control equipment may be driven by direct connection to a reversible motor or through intermediate clutching and braking means. The motion control apparatus, whatever form is chosen, is responsive to the signals from control circuitry, not shown, to start, stop, and reverse the tape upon command. The present invention is not concerned with the details of this processing activity, and they will not be described herein. Techniques of controlling tape transports for efficient processing of information are well developed and within the skill of the art.

When the tape 54 has been processed and is ready for removal from the processing chamber, it is simply rerolled onto base member 28 by appropriate rotation of the base member. Prior to rerolling the media, the source of vacuum to vacuum chamber 203 is shut down and atmospheric pressure is admitted to the chamber to relieve the pressure differential across the tape loop. When the rewind operation is completed, tool 212 is moved vertically. The detent portion of tool 212 engages the surface irregularity on the inner surface of base 28 and the base thus follows the tool up through the opening in the platform 211. Once base 28 is above platform 211, it is again locked with cover 26, and the entire cartridge is then either automatically or manually removed from the system.

It will be appreciated that the cartridge described herein can be used with systems that depart substantially from that shown in FIG. 7, and that the description of that system herein is not intended to limit this invention, but rather to illustrate an exemplary application. For example, one simple modification might include a magnetic clutch as couple 213 to engage the magnetically permeable material in flange 46 for driving the base member. In any event, one aspect of the present invention is the combination of the cartridge with a processing apparatus having means to receive the cartridge and an adjacent processing area into which the record media from the cartridge may be inserted for processing. The apparatus will also include means for disengaging the locking members of the cartridge and separating the base member from the cover member to expose the record media for processing, as well as means to position the base member and its media adjacent the processing area, means to draw the record media off of the base member for processing, and means to rewind the media onto the base member. Other processing arrangements can be visualized.

Choice of materials for the base, cover, and locking mechanism of the cartridge and detent may be such as to avoid wear and generation of debris within the cartridge and the storage apparatus. It may be readily appreciated that the various parts of the locking mechanism may be constructed of wear resistant resilient metals or plastics which do not deteriorate or generate particles upon contact and which provide sufficient stiffness to avoid manual unlocking of the cartridge. The choice of such materials is within the skill of the art.

It must also be understood that the preferred embodiments set forth, hereinabove, may be easily modified while leaving the resulting mechanism within the scope of the subject invention. For example, reversal of the parts of the locking mechanism from the cover member to the base member may be readily achieved and still be within the scope of this invention.

While one form of storage apparatus 10 has been shown in FIG. 1, the present invention also includes storage walls of other geometries. For example, for the most efficient and dense storage of cartridges, the storage compartments may be clustered in a close packed face centered arrangement such that the appearance of the matrix would approximate a honeycomb. In a similar manner, the geometry of the storage compartments themselves may be modified. For example, a chamber having a hexagonal cell structure would facilitate a face centered or honeycomb arrangement of the chambers. Similarly, a plurality of storage walls may be arrayed within a library system for automatic accessing. In one form of array a pair of walls opposed to one another, with the openings of the storage compartments all on a common center, would be particularly advantageous for automatic accessing by an article storage and retrieval device such as that shown in previously noted copending application Ser. No. 304,698.

It is therefore seen that the objects of this invention have been achieved. A storage system including supports for engaging a web containing cartridge and a coordinated strong and light-weight cartridge constructed to actively grip the support have been described. The details of the cartridge including a portion which actively grips a storage support or handling device, and a reel or hub which displays similar characteristics, has been detailed. A locking mechanism for a storage cartridge which cannot normally be manually opened and which requires a separate tool for disengagement has also been described. Finally, a web handling system adapted to utilize the characteristics of the storage cartridge has been detailed. The storage apparatus described permits high density filing of the cartridges and convenient accessibility. Additionally, secure support, storage, retrieval, and processing of the cartridge and its associated media is provided.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. Cartridge storage apparatus comprising, in combination:

at least one cartridge, said cartridge including in combination a base member, a cover member, and locking means for releasably locking said members in a closed position;

said base member comprising a hub having a first and second end and adapted for winding a web thereon, a fixed base plate extending radially outward from said hub at said first end, said second end of said hub being hollow and opened outwardly, said hollow open end exposing an inner surface of said hub including gripping means present as an irregularity of said inner surface and reachable through the hollow open end of said hub;

said cover member being generally cup-shaped with an end portion extending radially around a central annular opening and having an axially extending flange proximate its outer periphery, said flange extending to and engaging the base plate of said base member to define a web-receiving chamber around said hub;

said locking means including a first locking member integral with the central annular opening of the end portion of said cover member, and a second locking member integral with the second end of said hub, said locking members cooperating in interlocking engagement to secure said cover and base member together in a closed position; and cartridge storage means including detent means for separable engagement and support of said gripping means of said cartridge hub through the hollow open end of said hub.

2. The cartridge storage apparatus of claim 1 wherein magnetic record media in web form is wound around the hub of said base member in the web-receiving chamber defined by said closed base and cover members.

3. The storage apparatus of claim 1 wherein the face of said base plate opposed to said hub includes magnetically permeable material.

4. The cartridge storage apparatus of claim 1 including a storage wall having a multiplicity of storage compartments and a multiplicity of detent means, said detent means disposed within said storage compartments for separable engagement by the gripping means of said cartridge, said storage compartments providing additional support for said cartridge.

5. The cartridge storage apparatus of claim 4 wherein the face of said base plate opposed to the hub includes magnetically permeable material.

6. The cartridge storage apparatus of claim 1 wherein the detent means includes a plurality of flexible fingers adapted for insertion into the hollow open end of said hub for engagement with the gripping means of said hub and for separation from said gripping means in response to movement of said cartridge in a direction axial to said hub and away from said detent.

7. The cartridge storage apparatus of claim 6 wherein magnetic record media in web form is wound around the hub of said base member in the web-receiving chamber defined by said closed base and cover members.

8. The cartridge storage apparatus of claim 6 wherein said gripping means includes an indentation and a portion of said detent fingers is adapted to nest in said indentation.

9. The cartridge storage apparatus of claim 6 wherein said gripping means includes a protrusion and said detent fingers includes a portion adapted to engage said protrusion.

10. The cartridge storage apparatus of claim 9 wherein the face of the base plate opposed to the hub includes magnetically permeable material and said cartridge is separated from said detent in response to an external magnetic field acting upon the magnetically permeable portion of the base plate.

11. The cartridge storage apparatus of claim 10 wherein magnetic record media in web form is wound around the hub of said base member in the web-receiving chamber defined by said closed base and cover members.

12. In a cartridge for storing and handling a flexible wound web, said cartridge including in combination; a base member, a cover member, and locking means for releasably locking said members in a closed position for disengagement by a mechanism separate from said cartridge;

said base member comprising a hub having a first and second end and adapted for winding a web thereon, a fixed base plate extending radially outward from said hub at said first end, said second end of said hub being hollow and opened outwardly, said hollow open end exposing an inner surface of said hub;

said cover member being generally cup-shaped with an end portion extending radially around a central annular opening and having an axially extending flange proximate its outer periphery, said flange extending to and engaging the base plate of said base member to define a web-receiving chamber around said hub when said base and cover members are in a closed position;

said locking means including a first locking member integral with the central annular opening of the end portion of said cover member, and a second locking member integral with the second end of said hub, said locking members normally cooperating in interlocking engagement to secure said cover and base members together in a closed position, said locking members disengageable to permit separation of said cover member from said base member, the improvement comprising:

said hollow open end of the hub in said base member providing gripping means including an irregularity of said inner surface and reachable through the hollow open end of said hub when the cover and base member are in either closed or disengaged relationship.

13. The cartridge of claim 12 wherein magnetic record media in web form is wound around the hub of said base member in the web-receiving chamber defined by said closed base and cover members.

14. The cartridge of claim 12 wherein said locking means are designed to disengage normally only in response to mechanical means separate and distinct from said cartridge.

15. The cartridge of claim 14 wherein one of said locking members is a locking shoulder and the other of said locking members includes a plurality of flexible locking fingers, said fingers and said shoulder being brought into locking engagement in response to closure of said cover and said base member, said fingers and said shoulder being disengageable by mechanical camming means separate from said cartridge and designed to urge all of the fingers simultaneously out of contact with said shoulder, said fingers constructed and arrayed to frustrate their disengagement from said shoulder in the absence of said camming means.

16. The cartridge of claim 15 wherein said locking shoulder is integral with the annular opening in the end portion of said cover member and said flexible fingers are integral with the second end of said hub, and said separate mechanical camming means is designed to urge said fingers centrally inwards.

17. The cartridge of claim 16 wherein magnetic record media in web form is wound around the hub of said base member in the web-receiving chamber defined by said closed base and cover members.

18. The cartridge of claim 15 wherein the base member is a reel with a single flange, said base plate defining said flange, and wherein said hub is cylindrical.

19. The cartridge of claim 12 wherein the base plate of said base member has a flange proximate its outer periphery extending at an angle away from said base plate and in a direction opposed to said hub, said flange providing frictional contact with the axially extending flange of said cover member when said base and cover members are in a closed position.

20. The cartridge of claim 19 wherein said flange extending from said base plate is deformable, and the axially extending flange of the cover member is tapered at the end portion which contacts said deformable flange.

21. The cartridge of claim 12 wherein the face of said base plate opposed to the hub includes magnetically permeable material.

22. The cartridge of claim 21 wherein said base plate includes a central opening, said hub is hollow at its first end where it is fixed to said base plate, said central opening of said base plate providing access to the hollow portion of the first end of said hub, and wherein said magnetically permeable material extends radially around said opening of said base plate.

23. The cartridge of claim 22 wherein magnetic record media in web form is wound around the hub of said base member in the web-receiving chamber defined by said closed base and cover members.

24. The cartridge of claim 12 wherein the face of said base plate opposed to the hub includes clutch means for coupling the base member to a driving element outside of the cartridge.

25. The cartridge of claim 24 wherein the clutch is in the form of a plurality of teeth arrayed radially around said base plate.

26. The cartridge of claim 16 wherein the second end of said hub and including said flexible fingers is an element which is replaceably detachable from the balance of said hub.

27. The cartridge of claim 12 wherein the gripping means includes an indentation.

28. The cartridge of claim 12 wherein the gripping means includes a protrusion.

29. In a cartridge for storing and handling a flexible wound web, said cartridge including in combination a base member, a cover member, and locking means for releasably locking said members in a closed position for disengagement by a mechanism separate from said cartridge, comprising:

said base member including a cylindrical hub having a first and second end and adapted for winding a web thereon, a fixed base plate extending radially outward from said hub at said first end, said base plate having a deformable flange proximate its outer periphery extending at an angle away from said base plate and in a direction opposed to said hub, the face of said base plate opposed to said hub including a magnetically permeable portion and clutch means for coupling said base member to a driving element outside of said cartridge, said second end of said hub being hollow and opened outwardly, said hollow open end exposing an inner surface of said hub providing gripping means including an irregularity of said inner surface, said gripping means reachable through the hollow open end of said hub;

said cover member being generally cup-shaped with an end portion extending radially around a central annular opening and having an axially extending flange proximate its outer periphery, said flange terminating in an end portion extending to and engaging in frictional contact with said deformable flange around said base plate when said base and cover members are in a closed position, said end portion being tapered;

said locking means including a first locking member integral with the central annular opening of the end portion of said cover member, and a second locking member integral with the second end of said hub, said first locking member being a locking shoulder integral with the annular opening in the end portion of said cover member and said second locking member including a plurality of flexible locking fingers integral with the second end of said hub, said locking members normally cooperating in interlocking engagement to secure said cover and base members together in a closed position, said locking members designed to disengage normally only in response to mechanical means separate and distinct from said cartridge to permit separation of said cover member from said base member.

30. The cartridge of claim 29 wherein magnetic record media in web form is wound around the hub of said base member in the web-receiving chamber defined by said closed base and cover members.

31. A reel comprising a cylindrical hub having a first and second end and adapted for winding a web thereon, a fixed base plate extending radially outward from said hub at said first end, said base plate having a deformable flange proximate its outer periphery extending at an angle away from said base plate and in a direction opposed to said hub, the face of said base plate opposed to said hub including a central, magnetically permeable portion and clutch means for coupling said base member to a driving element outside of said reel, said second end of said hub being hollow and opened outwardly, said hollow open end exposing an inner surface of said hub providing gripping means including an irregularity of said inner surface, said gripping means reachable through the hollow open end of said hub.

32. An information processing system for handling flexible magnetic media, comprising:

a. a cartridge for a wound magnetic record media web, said cartridge including in combination a base member, a cover member, and locking means for releasably locking said members in a closed position;

said base member comprising a cylindrical hub having a first and second end and adapted for winding a web thereon, a fixed base plate extending radially outward from said hub at said first end, said base plate having a deformable flange proximate its outer periphery extending at an angle away from said base plate and in direction opposed to said hub, the face of said base plate opposed to said hub including a central magnetically permeable portion and clutch means for coupling said base member to a driving element outside of said cartridge, said second end of said hub being hollow and opened outwardly, said hollow open end exposing an inner surface of said hub providing gripping means including an irregularity of said inner surface, said gripping means reachable through the hollow open end of said hub;

said cover member being generally cup-shaped with an end portion extending radially around a central annular opening and having an axially extending flange proximate its outer periphery, said flange terminating in an end portion extending to and engaging in frictional contact with said deformable flange around said base plate when said base and cover members are in a closed position, said end portion being tapered;

magnetic record media in web form, said web wound around the hub of said base member;

said locking means including a first locking member integral with the central annular opening of the end portion of said cover member, and a second locking member integral with the second end of said hub, said first locking member being a locking shoulder integral with the annular opening in the end portion of said cover member and said second locking member including a plurality of flexible locking fingers integral with the second end of said hub, said locking members normally cooperating in interlocking engagement to secure said cover and base members together in a closed position, said locking members designed to disengage normally only in response to mechanical means separate and distinct from said cartridge to permit separation of said cover member from said base member;

b. a processing apparatus including a processing area adapted to receive the record media;

c. means for disengaging the locking members of said cartridge;

d. means for separating the base member from the cover member;

e. handling means including detent means for engagement and support of said gripping means of said base member;

f. means for positioning said base member adjacent the processing area of said processing apparatus;

g. means associated with said processing apparatus for withdrawing the record media from said base member and into the processing area;

h. coupling means for engaging the clutch portion of the base plate of said base member; and i. drive means cooperating with said coupling means to rotate said base member.

* * * * *

PO-1050
(5/69)

UNITED STATES PATENT OFFICE
CERTIFICATE OF CORRECTION

Patent No. 3,825,208 Dated July 23, 1974

Inventor(s) D. H. Johnston et al

It is certified that error appears in the above-identified patent and that said Letters Patent are hereby corrected as shown below:

Column 6, line 18, "44" should read --144--.

Column 8, line 25, delete "the" (second occurrence).

Signed and sealed this 3rd day of December 1974.

(SEAL)
Attest:

McCOY M. GIBSON JR.
Attesting Officer

C. MARSHALL DANN
Commissioner of Patents